Sept. 23, 1969 R. S. RICHMOND 3,468,635
LIQUID SAMPLING
Filed June 20, 1966 2 Sheets-Sheet 1
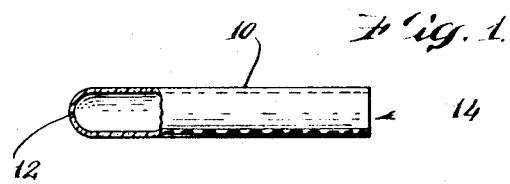
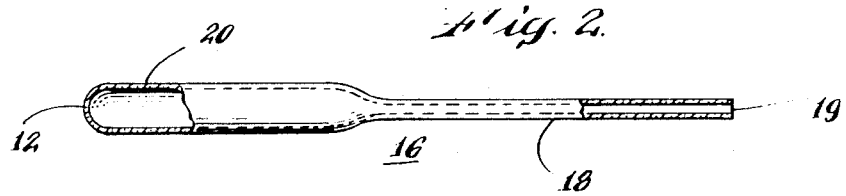
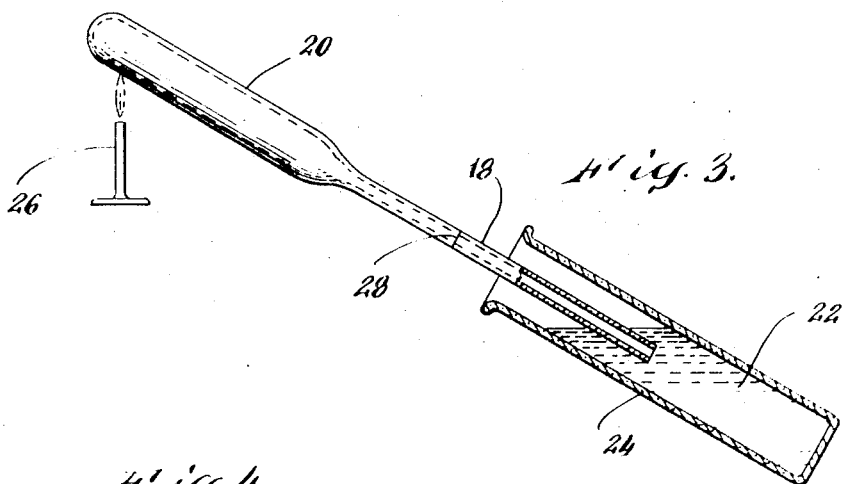
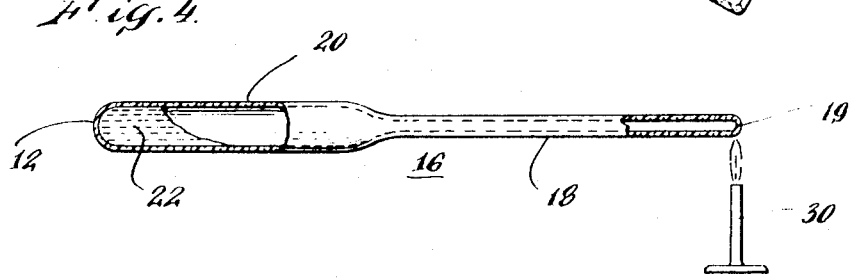
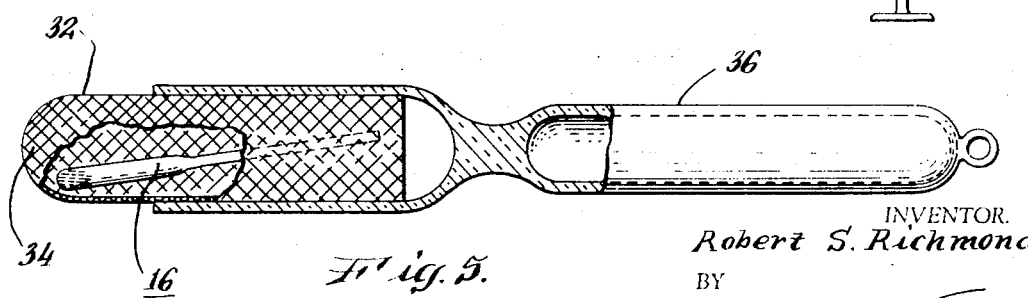
INVENTOR.
Robert S. Richmond
BY
Frank J. Thompson
ATTORNEY.

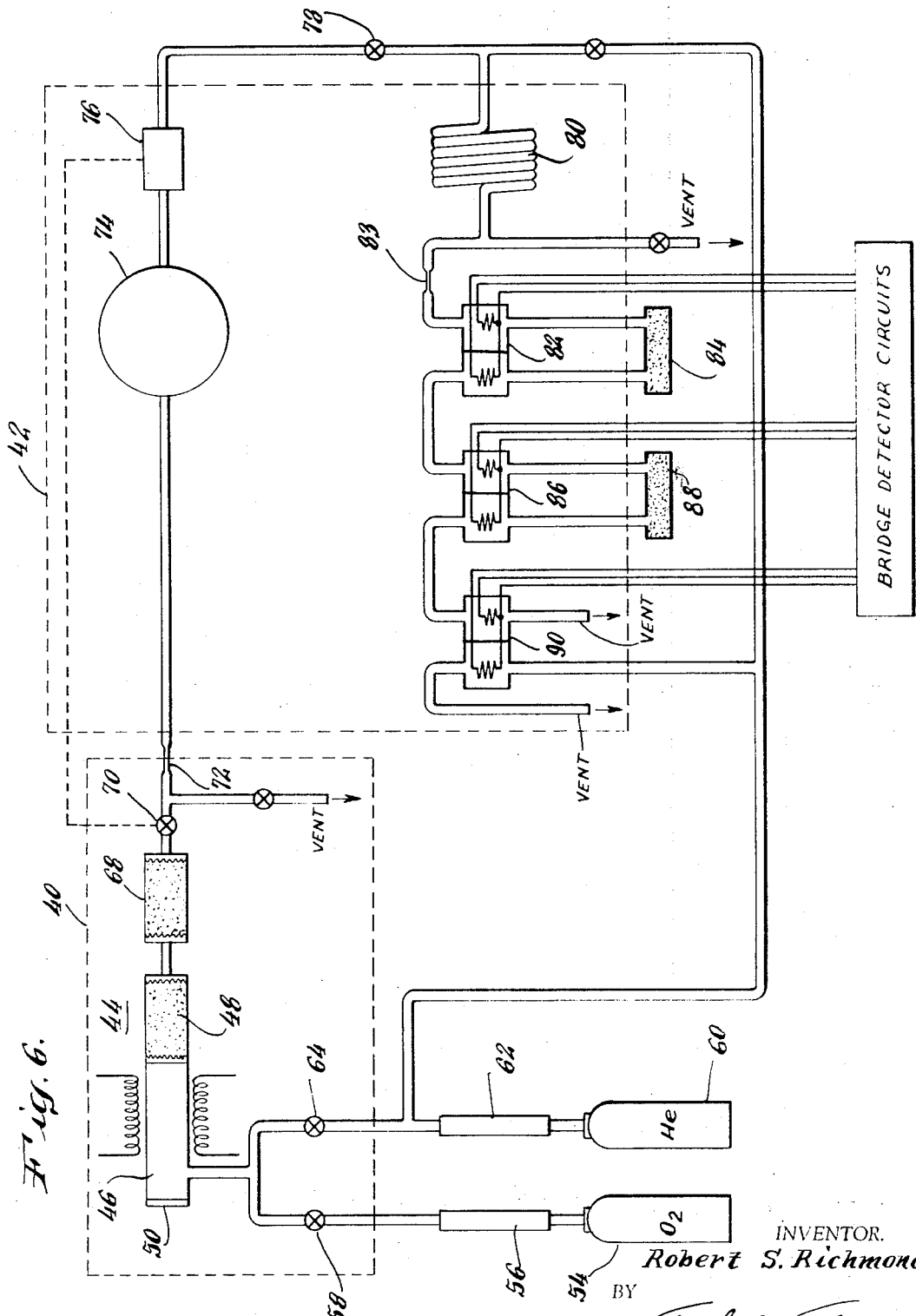

United States Patent Office 3,468,635
Patented Sept. 23, 1969

3,468,635
LIQUID SAMPLING
Robert S. Richmond, Westport, Conn., assignor to The Perkin-Elmer Corporation, Norwalk, Conn., a corporation of New York
Filed June 20, 1966, Ser. No. 558,696
Int. Cl. G01n 31/12, 1/28; B01l 3/00
U.S. Cl. 23—230                                   10 Claims

ABSTRACT OF THE DISCLOSURE

A fluid sample being analyzed is inserted into a destructible sample holder; the sample holder is sealed and shielded by an explosion barrier means; and the sample holder is inserted into and exploded in the combustion chamber of a combustion analyzing apparatus. With this arrangement, premature sample vaporization is inhibited while holder fragmentation is confined.

---

This invention relates to combustion analysis apparatus and more particularly to a method and a means for introducing a liquid sample into the apparatus.

Various microanalytical apparatus are known for burning a sample of organic compound in order to quantitatively analyze the elements of the compound. In general, the sample is placed in a combustion chamber of the apparatus and burned at a relatively high temperature. The products of the combustion are then conveyed to detection means which are adapted to respond-to and indicate relative quantities of predetermined components.

In a known arrangement for introducing a sample into the combustion chamber, the sample is placed in a boat of refractory material and the boat is inserted into the chamber. At times, the organic sample is in liquid form and because of its corresponding relatively high vapor pressure, as compared to solids, it will evaporate. Thus, because of these characteristics and the small sample quantities being burned, sampling techniques for preparing and introducing a liquid sample into a combustion analyzer generally differ from those employed when analyzing a sample existing in solid form.

In a known technique for analyzing a liquid sample, a sample holder is formed from a relatively small diameter glass tube having a closed end. The tube is drawn out at an open end to provide a sample holder having an elongated neck of relatively small bore. Sample holder weight is then measured. The neck portion is dipped into a liquid sample and the closed end of the tube is heated. As the tube cools, a quantity of the liquid sample is drawn into the narrow neck portion. The quantity of the sample entering the holder is regulated by varying the length of the period during which the holder is dipped in the sample.

A relatively accurate determination of the sample quantity which is being introduced into the apparatus is required and is made by weighing the holder and contained sample. This is accomplished by first forcing the liquid sample from the relatively narrow neck portion into the other end of the holder; by carefully sealing the open end; and, by weighing the holder and contents. The sample is then introduced into the combustion chamber by breaking the holder, placing the holder pieces in a boat, and inserting the boat in a combustion tube of the apparatus. The sample is burned and the combustion products are conveyed to detectors in the apparatus for determining components of the sample. Relatively small liquid sample quantities are employed with this technique and they must accordingly be handled with dispatch in order to keep sample loss at a minimum after the holder is broken.

It is an object of this invention to provide an improved method and means for introducing a liquid sample into a combustion analyzing apparatus.

Another object of the invention is the provision of a method and apparatus adapted for introducing a liquid sample into a combustion analyzing apparatus and which substantially inhibits the loss of measured sample through vaporization.

In one form of combustion analyzing apparatus, the combustion chamber is exposed to the atmosphere upon insertion of a sample. A flush cycle is provided, prior to combustion, in order to purge the apparatus of atmospheric gases which enter the chamber during the sample insertion. Purging is accomplished by flowing a gas through the chamber in order to sweep out the contaminating gases. However, when employing the liquid sample insertion technique described hereinbefore in an apparatus of this type, the purging gases sweep away a relatively large quantity of the vaporizing liquid. Thus, the accurately measured quantity cannot be retained for combustion.

It is another object of the present invention to provide an improved method and apparatus for introducing a liquid sample into a combustion analytical apparatus which is adapted to purge foreign gases from the apparatus.

Another object of the invention is to provide a liquid sampling method and means for use with a combustion analytical apparatus having a flush cycle.

Briefly, in accordance with a feature of the invention, a liquid sample is inserted into a sample holder, the sample holder is sealed and shielded by an explosion barrier means; and the sample holder is inserted into and exploded in the combustion chamber of a combustion analyzing apparatus. By this arrangement, sample vaporization is inhibited while holder fragmentation is confined. The useful life of a combustion tube is thereby prolonged.

These and other objects and features of the invention will become apparent with reference to the following specification and drawings wherein:

FIGURE 1 is a view of a tube from which a sample holder is formed;

FIGURE 2 illustrates a sample holder formed from the tube of FIGURE 1;

FIGURE 3 illustrates a method for inserting a sample into a sample holder;

FIGURE 4 illustrates a fabricated sample holder containing a sample;

FIGURE 5 illustrates an explosion barrier and sample holder and contents supported in a ladle; and FIGURE 6 is a block diagram illustrating a combustion analysis apparatus.

Referring now to FIGURES 1 through 5, a method and apparatus for preparing and introducing a liquid sample into a combustion analyzer will be described. The combustion analyzer, illustrated in FIGURE 6, will be briefly described hereinafter. A soft glass melting point, tube 10 (FIGURE 1) which is closed at one end 12 is heated and drawn out at an open end 14 thereof in a conventional manner to form a sample holder 16 (FIGURE 2). The sample holder includes an elongated, neck portion 18 of capillary dimension having a fill aperture 19 and a relatively larger volume reservoir portion 20. In a particular arrangement, the tube 10 comprises a 1 mm. O.D. soft glass, melting point tube and is drawn out beginning at ½ inch from the closed end. The resultant sample holder 16 has a reservoir 20 approximately 8 mm. in length, and a neck section 18 approximately 17 mm. in length and .25 mm. outside diameter.

Preparing and introducing a liquid sample into a combustion analyzer apparatus necessitates accurate measurements of sample weight. The sample holder of FIGURE 2 is weighted on a microbalance. As illustrated in FIGURE 3, liquid sample 22 is entered into the holder by immersing the fill aperture 19 into a sample container 24 and heating the reservoir 20 with suitable means such as a burner 26. This heating increases the internal pressure within the reservoir 20 and forces gases therefrom through the liquid sample 22. The reservoir is then cooled and an accompanying low pressure within the reservoir causes the sample to be drawn up into the holder. A desired quantity can be drawn into the neck portion 18 by cooling the holder for a period of time until the liquid level in the neck 18 rises to some quantity mark 28.

Sealing of the holder 16 is accomplished by heating the fill aperture 19 (FIGURE 4). However, in order to reduce vaporization and loss of the sample, the container and sample of FIGURE 3, having the liquid sample occupying the elongated neck portion 18, is placed on a conventional centrifuge machine. The holder 16 can be placed closed end 12 downwardly in a conventional centrifuge tube and hand centrifuged. Liquid sample 22 is thereby forced down the walls of the elongated neck section 18 and into the reservoir 20, as shown in FIGURE 4. Sealing of the open end is effected conventionally by the application of heat from a torch or bunsen burner 30 as shown. The sample holder and contents is then accurately weighed on a microbalance for determining the weight of the liquid sample.

As indicated previously, prior techniques have included breaking the holder, quickly inserting the pieces of the holder in a boat, and rapidly placing the boat in the combustion chamber. However, this technique is disadvantageous in that liquid sample is lost through vaporization in the period between weighing of the holder and combustion. In addition, the technique is not adapted for use with combustion analysis apparatus having a flush cycle. In accordance with a feature of this invention, the holder 16 (FIGURE 4) remains sealed, and is then shielded by an explosion barrier 32 (FIGURE 5). When the sealed holder 16 is inserted into the combustion chamber, the relatively high temperature causes internal pressure of the holder to rise rapidly and the holder to explode. The liquid sample escapes from the holder and is burned and the combustion products are conveyed to separating and detection means.

Upon explosion, soft glass of the holder is scattered. The scattering of glass is restricted by the explosion barrier 32. In FIGURE 5, the explosion barrier is shown to comprise a tubular mesh screen closed at one end 34. The screen 32, in a particular arrangement, comprises an 80 mesh platinum screen tube. Both the sealed sample holder 16 and the mesh screen tube are positioned in an insertion apparatus comprising a quartz ladle 36. The ladle is then inserted into a combustion chamber 44 (FIGURE 6). In one insertion arrangement, the ladle 36 includes a body of magnetic material. The ladle is placed in the glass combustion chamber 44 (FIGURE 6) and moved into the hot zone by movement of an external magnet. Upon explosion of the sample holder 16, the sample immediately vaporizes and passes through the mesh 32 while projecting glass particles are collected at the closed end of the mesh. Upon completion of the analysis, the ladle is removed from the combustion chamber and the glass particles are removed from the screen.

The explosion barrier is adapted to be permeable to the vaporized sample yet impermeable to the glass particles. In addition to containing the glass particles, the explosion barrier 32 of FIGURE 5 provides for a more uniform heating of the capillary in the combustion chamber and effects a less violent explosion. Further, it is advantageously formed of a material which operates as a catalytic surface on which to break down undesirable substances, which may be formed, as for example, platinum breaking down methane.

A combustion analysis apparatus having a flush cycle and with which the described liquid sampling may advantageously be employed is illustrated in FIGURE 6. The apparatus includes a combustion train indicated generally as 40 and a controlled temperature oven indicated generally as 42. The combustion train 40 includes a combustion tube 44 having a relatively cooler inlet section 46 and a relatively hotter oxidizing section 48. The temperature of the combustion tube (900° C.) is controlled from an external heating source (not shown). The inlet section 46 of the combustion tube is arranged to receive a sample supported by a ladle 36 (FIGURE 5) or a combustion boat (not shown) through a removable end cap 50 while the outlet section 48 contains an oxidizing agent such as copper oxide or cobaltous oxide. Oxygen for combustion is derived from a source 54 and conducted to the combustion tube through a scrubber 56 and valve 58. A carrier gas, such as helium, is derived from a source 60 and similarly conducted to the combustion tube via a scrubber 62 and valve 64.

A sample to be analyzed is placed in the tube 44. Upon combustion, oxygen is removed from the combustion products in a heated reduction tube 68 and these products pass through a control valve 70 and a flow restrictor 72 to a reservoir 74. A pressure switch 76 and valve 78 couple the reservoir 74 to an elongated delay volume in the form of a coiled tube 80. The outlet of the delay volume connects to a water measuring cell 82 through a flow restrictor 83. The water measuring cell is of the type which measures thermal conductivity by means of a thermistor or hot filament bridge. Combustion products pass successively through the cell 82, a water trap 84, a carbon dioxide measuring cell 86, a $CO_2$ trap 88, a nitrogen measuring cell 90, and are then exhausted to the atmosphere.

Prior to the introduction of the sample, the device is placed in a standby condition in which all elements are thoroughly flushed with helium gas. The valves are then cam operated to establish the desired flushing cycle. This cycle includes initial forward and back flushing and purging after inserting the sample. An apparatus of this type which is of a pneumatic self-integrating class is currently marketed by the assignee of this invention and is identified as the Model 240 Elemental Analyzer.

An improved method and apparatus has thus been described for providing and inserting a liquid sample in a combustion analysis apparatus.

Various modifications may be made in the described method and apparatus as well occur to those skilled in the art without departing from the spirit of the invention or the scope of the appended claims.

I claim:

1. A method for introducing a liquid sample into a combustion chamber of an analytical apparatus comprising the steps of:
   inserting a quantity of the liquid sample into a sample holder,
   sealing the sample holder,
   forming an explosion barrier for containing particles of the sample holder upon explosion thereof, and
   inserting the sealed sample holder into the combustion chamber.

2. A method for introducing a liquid sample into a combustion chamber of an analytical apparatus comprising the steps of:
   forming a sample holder of a material which when sealed will shatter upon entrance into a hot zone of the combustion chamber,
   inserting a quantity of a liquid sample into the holder,
   sealing the holder,
   supporting the holder on a combustion chamber insertion apparatus, forming an explosion barrier for inhibiting projection of sample holder particles upon explosion, and inserting the sealed holder into a combustion chamber of the apparatus.

3. A method for introducing a liquid sample into a combustion chamber of an analytical apparatus comprising the steps of:

forming a glass sample holder having a reservoir portion and an elongated neck portion terminating in a fill aperture for the holder, inserting a quantity of liquid sample into the holder by immersing the fill aperture in a reservoir of liquid sample, heating the holder, and cooling the holder, forcing the inserted sample into the holder reservoir portion, heating the fill aperture for sealing the holder, supporting the holder on a combustion chamber insertion apparatus, forming an explosion barrier for inhibiting projection of glass particles from the insertion apparatus upon explosion of the holder, and inserting the holder into the combustion chamber.

4. The method of claim 3 wherein said explosion barrier is formed of a wire screen material.

5. The method of claim 4 wherein said wire screen material is formed of a material for reducing a component of the sample.

6. The method of claim 5 wherein said screen is formed of platinum.

7. A method for preparing and inserting an organic liquid sample into a combustion chamber of a microanalytical apparatus, comprising the steps of:

forming a glass sample holder having a reservoir portion and an elongated neck portion of capillarary dimension terminating in a fill aperture for the holder, weighing the holder to determine the weight thereof, inserting a quantity of liquid sample into the neck portion of the holder by immersing the fill aperture in a reservoir of liquid sample, heating the holder reservoir portion, and cooling the holder, centrifugeing the sample holder for forcing the liquid sample into the reservoir portion of the holder, heating the fill aperture for sealing the holder, supporting the holder on a combustion chamber insertion apparatus, forming a wire screen explosion barrier adapted to inhibit projection of glass particles from the insertion apparatus upon explosion of the holder, and inserting the holder into the combustion chamber.

8. An insertion apparatus for inserting a fluid sample into a relatively high temperature combustion chamber of a micro-analytical apparatus comprising:

a sample holder formed of a material which is sealed to define a closed volume and adapted to contain a quantity of sample and to explode upon insertion into the relatively high temperature combustion chamber, and means permeable to the vaporized sample for restricting projection of fragments of the exploding sample holder, said means adapted to be positioned between said combustion chamber and sample holder and to substantially enclose said sample holder.

9. The apparatus of claim 8 wherein said holder is formed of low melting point glass.

10. The apparatus of claim 9 wherein said projection restricting means comprises a wire mesh screen.

References Cited

| | | | |
|---|---|---|---|
| 3,050,372 | 8/1962 | Scott. | |
| 3,127,855 | 4/1964 | Conlon | 23—292 X |

OTHER REFERENCES

Fisher, Modern Laboratory Appliances, catalog 63, pp. 27, 318 (1962).

MORRIS O. WOLK, Primary Examiner

E. A. KATZ, Assistant Examiner

U.S. Cl. X.R.

23—253; 73—425.4